Figure 1:
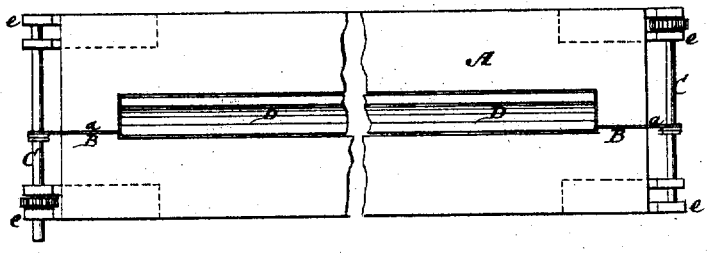

M. DELANEY.

Billiard Cushions.

No. 5,681. Reissued Dec. 9, 1873.

*Witnesses.*

E. Wolf,

Jacob Felbel

*Inventor.*

Mathew Delaney

By his attorney

J. N. McGuire

A.M.F. PHOTO-LITHOGRAPHIC Co. N.Y. (OSBORNE'S PROCESS.)

UNITED STATES PATENT OFFICE.

MATHEW DELANEY, OF NEW YORK, N. Y.

IMPROVEMENT IN BILLIARD-CUSHIONS.

Specification forming part of Letters Patent No. 116,819, dated July 11, 1871; reissue No. 5,681, dated December 9, 1873; application filed November 11, 1873.

DIVISION B.

*To all whom it may concern:*

Be it known that I, MATHEW DELANEY, of New York city, in the county and State of New York, have invented certain new and useful Improvements in Billiard-Cushions; and I do hereby declare the following to be a full, clear, and exact description thereof, reference being had to the accompanying drawings forming part of this specification.

Previous to my invention it has been customary in the manufacture of rubber billiard-cushions to employ various kinds of cords, strips, and wires, either arranged within or upon the face of the cushion; but in all instances in which any such auxiliary spring or re-enforcing device has been arranged within the body of the cushion it has been either molded fast in the rubber or inserted in a hole or seat formed in the stock or body, but cut out to the surface of the cushion, either on the face or top of the latter, so that the wire cord or strip to be used could be inserted through such cut or communication.

It has been suggested to employ in the rubber cushion some sort of wire or fine strip, which shall be arranged in a hole, so that it can be held under tension and independently of the rubber through which it passes, and this kind of cushion, for which Letters Patent were granted to me, is practically successful and desirable when properly made; but in the manufacture of cushions of this kind considerable difficulty has been found in preparing the rubber body properly with a straight smooth hole for the subsequent reception of the wire spring.

I have devised a way of molding the cushion with a core held under tension, by which all the difficulty has been overcome. and by means of which I am enabled to produce the rubber bodies of cushions with small straight holes of any size or shape desired, and this part of my invention I have fully set forth and claimed in another application filed simultaneously with this. The invention made the subject of this application is the product of the machine or molding apparatus claimed in my other application, and may possibly, however, be produced by some other means.

My present invention consists in a rubber strip or cushion-body, molded of the proper form and size to adapt it to the uses of a cushion for billiard-tables, and formed with a small hole or holes, perfectly straight and parallel with the face of the cushion, and adapted to receive and hold any suitable wire, spring, cord, or other auxiliary device of corresponding size and shape in cross-section, substantially as hereinafter more fully described.

To enable those skilled in the art to make and use my new rubber cushion-body, I will proceed to more fully explain my invention, referring, by letters, to the accompanying drawings, in which I have illustrated both the cushion-body and the apparatus for making the same.

Figure 2:
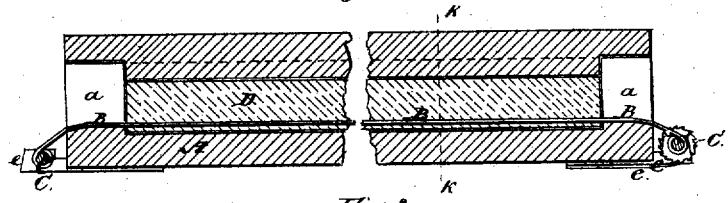
Figure 3:
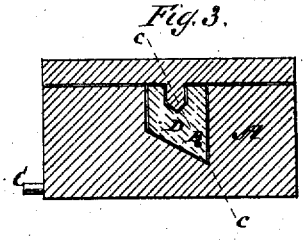

In Figure 1 is shown a mold containing one of my improved cushion-bodies. At Fig. 2 is a longitudinal section of the same, and at Fig. 3 is a cross-section of the same at the line *k k* of Fig. 2.

As the molding apparatus is fully described in my other application, I need not refer to it here.

D is the cushion, which is made of rubber vulcanized in the well-known manner, and which is made of the proper length for the side or end rail of the size of table on which it is to be used. In cross-section the cushion-body D is made, by preference, of the shape clearly shown at Fig. 3, and it is formed or molded, as seen, with a cavity in its back side. The precise shape of the cushion is not, however, material, and may be varied to suit the ideas of the table manufacturer. At $B^2$, Fig. 3, is seen a small round hole in the body of the cushion. This hole is formed by the use of a wire core, B, in the manner described in my other application, and it runs entirely through the cushion from end to end, parallel with the corner, or face of impact of the cushion, and in a perfectly right line. This hole is for the reception of the auxiliary wire spring or cord—such, for instance, as seen in my patent of 1869 for billiard-cushions—and may be made of any proper size and shape to adapt it to the particular sort of auxiliary spring or cord which it is intended shall be used in the cushion-body.

If it be desired to use more than one such wire or cord in the finished cushion, then the cushion-body D should of course be formed with a series of such holes as seen at $B^2$, located at such distances apart and from the face of the cushion as it may be desired to locate the spring wires or cords.

It will be understood that, as the gist of my invention rests in the idea of a rubber cushion-body formed with a suitable small channel or channels, or with a small hole or holes, cored out near the face, and adapted for the insertion and retention of a wire or other cord, or auxiliary device or devices, which is not at any point throughout its entire length secured fast to or molded into the stock of the body D, it is not material, in carrying out my invention, as to the form of cushion-body used, or whether one or more such holes or small longitudinal passages be formed, or whether such hole or holes be perfectly round or formed round a core of some other than a circular form in cross-section.

I am aware that a cushion has been made with a large or hole passage cored out of its body—as, for instance, in such a cushion as shown in the patent of G. D. Sharp, November 15, 1859, or as seen in the hollow tubular rubber cushions made and used long prior to said patent; but such a cushion-body is substantially different from one formed with a small passage or passages near and parallel with the face, and adapted to the use therein of a wire or spring auxiliary device, such as is contemplated by me, and for which my cushion-body is intended.

Having so fully explained my improved cushion-body for billiard-tables that one skilled in the art can understand and use my invention, what I claim as new, and desire to secure by Letters Patent, is—

A rubber cushion-body molded into a solid mass, and provided with a hole adapted to serve as a pocket for the reception of a wire to act as an auxiliary spring, formed parallel with the face of the cushion and at the proper height relatively to the line of impact of the balls, substantially as described.

In testimony whereof I have hereunto set my hand and seal this 16th day of October, 1873.

MATHEW DELANEY. [L. S.]

In presence of—
J. N. McINTIRE,
JACOB FELBEL.